(12) United States Patent
Moore et al.

(10) Patent No.: US 8,095,728 B2
(45) Date of Patent: Jan. 10, 2012

(54) METHOD AND SYSTEM FOR POWER AWARE I/O SCHEDULING

(75) Inventors: William H. Moore, Fremont, CA (US); Darrin P. Johnson, San Jose, CA (US); George R. Wilson, Brisbane, CA (US)

(73) Assignee: Oracle America, Inc., Redwood City, CA (US)

( * ) Notice: Subject to any disclaimer, the term of this patent is extended or adjusted under 35 U.S.C. 154(b) by 936 days.

(21) Appl. No.: 12/105,414

(22) Filed: Apr. 18, 2008

(65) Prior Publication Data

US 2009/0265519 A1  Oct. 22, 2009

(51) Int. Cl.
*G06F 13/20* (2006.01)
*G06F 12/00* (2006.01)

(52) U.S. Cl. ........... 711/114; 710/17; 711/156; 713/324

(58) Field of Classification Search .................. None
See application file for complete search history.

(56) References Cited

U.S. PATENT DOCUMENTS

| | | | |
|---|---|---|---|
| 4,144,522 A | 3/1979 | Kageyama et al. |
| 5,129,085 A | 7/1992 | Yamasaki et al. |
| 5,155,847 A | 10/1992 | Kirouac et al. |
| 5,371,885 A | 12/1994 | Letwin |
| 5,403,639 A | 4/1995 | Belsan et al. |
| 5,410,667 A | 4/1995 | Belsan et al. |
| 5,675,802 A | 10/1997 | Allen et al. |
| 5,819,292 A | 10/1998 | Hitz et al. |
| 6,209,111 B1 | 3/2001 | Kadyk et al. |
| 6,341,341 B1 | 1/2002 | Grummon et al. |
| 6,728,922 B1 | 4/2004 | Sundaram et al. |
| 6,745,284 B1 | 6/2004 | Lee et al. |
| 6,745,305 B2 | 6/2004 | McDowell |
| 6,795,966 B1 | 9/2004 | Lim et al. |
| 6,829,617 B2 | 12/2004 | Sawdon et al. |
| 6,857,001 B2 | 2/2005 | Hitz et al. |
| 6,892,211 B2 | 5/2005 | Hitz et al. |
| 7,007,196 B2 | 2/2006 | Lee et al. |
| 7,032,154 B2 | 4/2006 | Kidorf et al. |
| 7,043,677 B1 | 5/2006 | Li |
| 7,133,964 B2 | 11/2006 | Rodrigues et al. |
| 7,162,486 B2 | 1/2007 | Patel et al. |

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 Pages).

(Continued)

*Primary Examiner* — Gary Portka
(74) *Attorney, Agent, or Firm* — Osha • Liang LLP

(57) ABSTRACT

A method for retrieving a logical block, including receiving a request to read the logical block, and obtaining metadata associated with the logical block, wherein the metadata includes a replication type used to store the logical block and physical block locations in a storage pool for each physical block associated with the logical block. The method further includes obtaining power state information including a power state for the storage devices specified in the physical block locations, selecting a first set of physical block locations using the metadata, the power state information, and a power-usage selection policy, and generating I/O requests, where each I/O request specifies one of the first set of physical block locations. The method further includes issuing the I/O requests, receiving physical blocks in response to the I/O requests, and constructing the logical block using the physical blocks.

20 Claims, 8 Drawing Sheets

U.S. PATENT DOCUMENTS

| | | | |
|---|---|---|---|
| 7,174,352 | B2 | 2/2007 | Kleiman et al. |
| 7,200,715 | B2 | 4/2007 | Kleiman et al. |
| 7,584,229 | B2 * | 9/2009 | Moore et al. ........................ 1/1 |
| 7,840,657 | B2 * | 11/2010 | Moore et al. ................ 709/222 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2005/0246388 | A1 * | 11/2005 | Yamatake ................ 707/200 |
| 2006/0218644 | A1 | 9/2006 | Niles et al. |
| 2009/0216910 | A1 * | 8/2009 | Duchesneau ............... 709/250 |

OTHER PUBLICATIONS

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"Veritas File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 Usenix Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrators Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

METHOD AND SYSTEM FOR POWER AWARE I/O SCHEDULING

CROSS-REFERENCE TO RELATED APPLICATIONS

The present application contains subject matter that may be related to the subject matter in the following U.S. patent applications, which are all assigned to a common assignee: "Method and System for Reallocating Blocks in a Storage Pool" (application Ser. No. 11/591,422) filed on Oct. 31, 2006; and "Method and Apparatus for Power-Managing Storage Devices in a Storage Pool" (application Ser. No. 11/591,234) filed Oct. 31, 2006.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk. To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Using the aforementioned infrastructure, when the application wants to perform an Input/Output (I/O) operation (i.e., a request to read data from the file system or a request to write data to the file system), the application issues an I/O request to the operating system. The operating system forwards the I/O request to the file system. The file system upon receiving the I/O request, forwards the I/O request to the volume manager. The volume manager, in turn, forwards the I/O request to I/O subsystem which places the I/O request in the appropriate device specific I/O queues. The storage devices subsequently perform the I/O request. Typically, once an I/O request is issued to the I/O subsystem, the file system and volume manager is unable to control the scheduling (and subsequent processing) of the I/O request.

SUMMARY

In general, in one aspect, the invention relates to a method for retrieving a logical block, comprising receiving a request to read the logical block, obtaining metadata associated with the logical block, wherein the metadata comprises a replication type used to store the logical block, and physical block locations in a storage pool for each physical block associated with the logical block, wherein each physical block location specifies one of a plurality storage devices in the storage pool, obtaining power state information comprising a power state for each of the storage devices specified in the physical block locations, selecting a first set of physical block locations using the metadata, the power state information, and a power-usage selection policy, and generating a first set of I/O requests, wherein each I/O request specifies one of the first set of physical block locations, issuing the first set of I/O requests, receiving a first set of physical blocks in response to the first set of I/O requests, and constructing the logical block using the first set of physical blocks.

In general, in one aspect, the invention relates to a system, comprising a storage pool comprising a plurality of storage devices, a file system comprising an I/O scheduler configured to receive a request to read a logical block, obtaining metadata associated with the logical block, wherein the metadata comprises a replication type used to store the logical block, and physical block locations in the storage pool for each physical block associated with the logical block, wherein each physical block location specifies one of the plurality storage devices in the storage pool, obtain power state information comprising a power state for each of the storage devices specified in the physical block locations, select a first set of physical block locations using the metadata, the power state information, and a power-usage selection policy, generate a first set of I/O requests, wherein each I/O request specifies one of the first set of physical block locations, and issue the first set of I/O requests, and wherein the file system is configured to receive the first set of physical blocks in response to the first set of I/O requests, and constructing the logical block using the first set of physical blocks.

In general, in one aspect, the invention relates to a computer readable medium comprising computer readable program code embodied therein for causing a computer system to receive a request to read a logical block, obtain metadata associated with the logical block, wherein the metadata comprises a replication type used to store the logical block, and physical block locations in a storage pool for each physical block associated with the logical block, wherein each physical block location specifies one of a plurality storage devices in the storage pool, obtain power state information comprising a power state for each of the storage devices specified in the physical block locations, select a first set of physical block locations using the metadata, the power state information, and a power-usage selection policy, and generate a first set of I/O requests, wherein each I/O request specifies one of the first set of physical block locations, issue the first set of I/O, receive a first set of physical blocks in response to the first set of I/O requests, construct the logical block using the first set of physical blocks.

Other aspects of the invention will be apparent from the following description and the appended claims.

DETAILED DESCRIPTION

Figure 1:
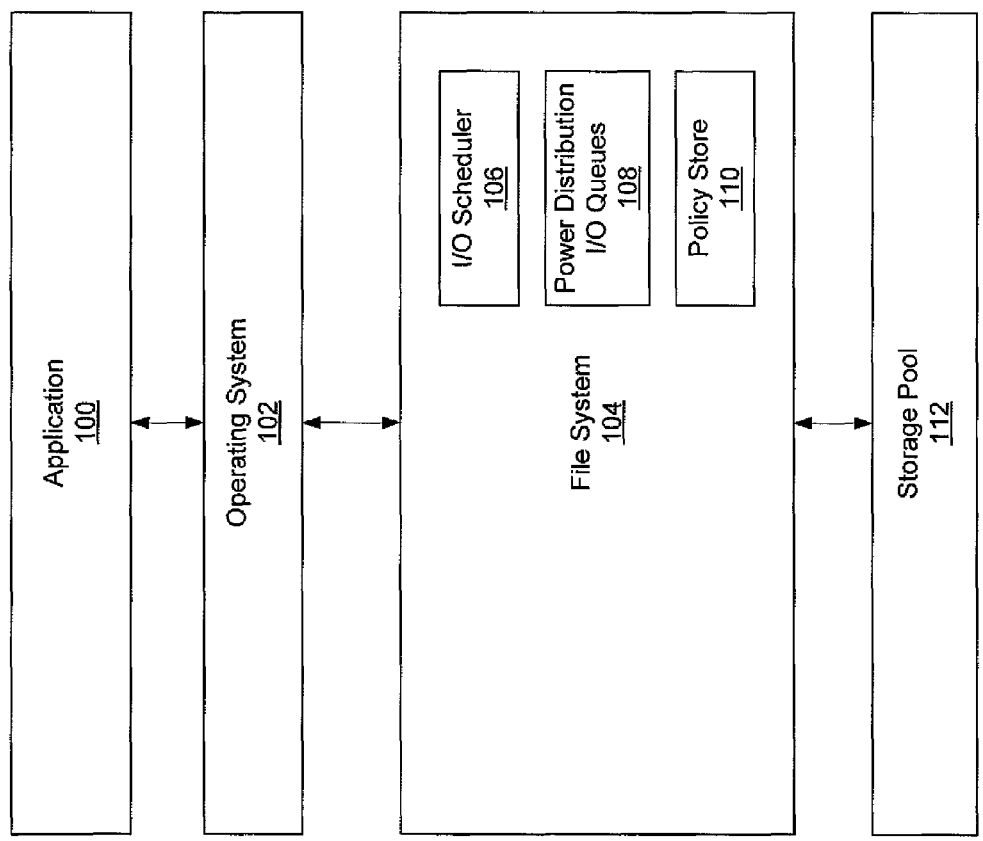
FIG. 1 shows a system diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for power-aware Input/Output (I/O) scheduling. Specifically, in one or more embodiments of the invention, an I/O scheduler uses a power-use selection policy to determine a subset of physical blocks from which to read data and construct a requested logical block. In one or more embodiments of the invention, the power-use selection policy evaluates the power state of storage devices in a storage pool to determine the most efficient subset of physical blocks (from a power utilization perspective) from which to read and construct a logical block.

FIG. 1 shows a system architecture in accordance with one or more embodiments of the invention. The system architecture includes an application (100) interfacing with an operating system (102). Further, the operating system (102) includes functionality to interact with a file system (104), which in turn interfaces with a storage pool (112). The operating system (102) typically interfaces with the file system (104) via a system call interface (not shown). The operating system (102) provides operations for users to access files within the file system (104). These operations may include read, write, open, close, etc, In one embodiment of the invention, the file system (104) is an object-based file system (i.e., both data and metadata are stored as objects). More specifically, the file system (104) includes functionality to store both data and corresponding metadata in the storage pool (112). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (112). Further, the file system (104) includes functionality to write the data into the storage pool (112).

In accordance with one embodiment of the invention, the file system (104) may include an I/O scheduler (106), power distribution I/O queues (108), a policy store (110), a compression module (not shown), an encryption module (not shown), a checksum module (not shown), and a metaslab allocator (not shown). Each of these aforementioned modules may be used by the file system (104) to read data from and/or write data to the storage pool (112). Each of the aforementioned modules is detailed below.

In one embodiment of the invention, the I/O scheduler (106) receives I/O requests and groups the I/O requests into transaction groups. According to one or more embodiments of the invention, the I/O requests are assigned to one of the power distribution I/O queues (108). The compression module (not shown) provides functionality to compress larger logical blocks into smaller segments, where a segment is a region of physical disk space. Further, the encryption module (not shown) provides various data encryption algorithms. The data encryption algorithms may be used, for example, to prevent unauthorized access. In one or more embodiments of the invention, the checksum module (not shown) includes functionality to calculate a checksum for data and metadata within the storage pool. The checksum may be used, for example, to ensure data has not been corrupted. As discussed above, the file system (104) provides an interface to the storage pool (112) and manages allocation of storage space within the storage pool (112). More specifically, in one or more embodiments of the invention, the file system (104) uses the metaslab allocator (not shown) to manage the allocation of storage space in the storage pool (112).

In one or more embodiments of the invention, the storage pool (112) includes one or more physical disks. Further, in one or more embodiments of the invention, the storage capacity of the storage pool (112) may increase and decrease dynamically as physical disks are added and/or removed from the storage pool.

In one or more embodiments of the invention, the file system (104) includes one or more power distribution I/O queues (108). Each power distribution I/O queue (108) is associated with a physical disk in the storage pool (112). Each power distribution I/O queue (108) typically holds the I/O requests for a particular physical disk within the storage pool (112). Alternatively, there may be one power distribution I/O queue (108) for the entire storage pool (112) (or for a portion of the storage pool (112)). In one or more embodiments of the invention, the file system (104) includes functionality to select which power distribution I/O queue (108) to send an I/O request. In one or more embodiments of the invention, the file system (104) includes the functionality to select which power distribution I/O queue (108) using the I/O scheduler (106), a policy in the policy store (110), and metadata regarding the physical disks in the storage pool (112).

Figure 2:
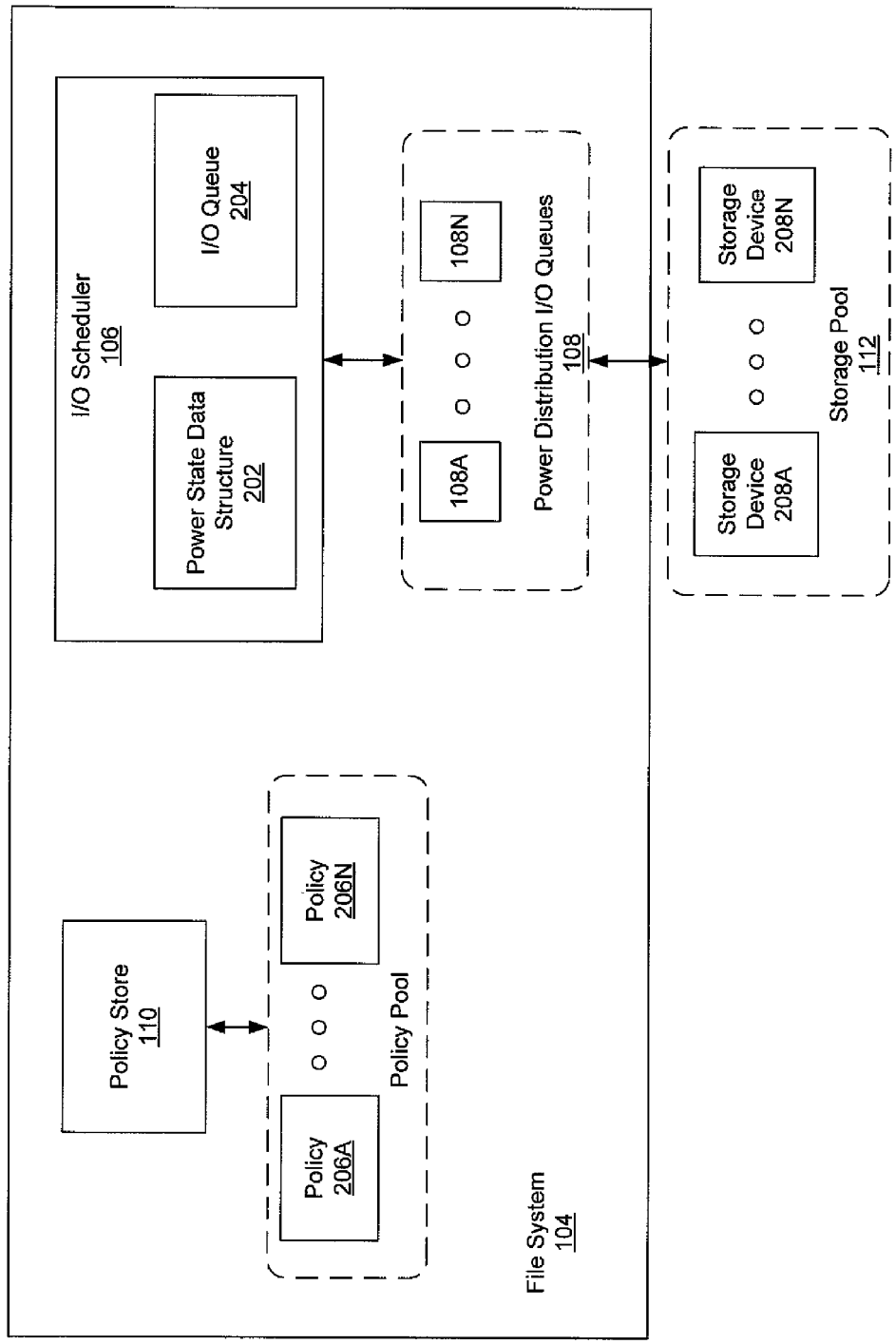
FIG. 2 shows a block diagram of a file system in accordance with one or more embodiments of the invention.

FIG. 2 shows a block diagram of a file system in accordance with one or more embodiments of the invention. The file system (104) includes an I/O scheduler (106) and one or more power distribution I/O queues (108). The I/O scheduler (106) includes a power state data structure (202) and an I/O queue (204) and is used to manage various I/O requests. In one or more embodiments of the invention, the power state data structure (202) is configured to store metadata regarding the power states of each of a set of storage devices in a storage pool. The I/O queue (204) is used to initially store I/O requests sent from applications. In one or more embodiments of the invention, each of the power distribution I/O queues (108) corresponds to a storage device in a storage pool (112).

In addition, the file system (104) includes a policy store (110). The policy store (I 10) includes a number of policies (206A-206N). According to one or more embodiments of the invention, one or more of these policies correlate to a power-use selection policy for selecting a set of physical blocks to read and construct a logical block. For example, a policy (206A) may select blocks based on the amount of power required to obtain the blocks, where the selected blocks minimize the amount of power required to obtain the blocks. Another policy (206N) may select blocks based on the amount of power required to obtain the blocks combined with a minimal performance requirement (e.g., latency between I/O request and response to I/O request).

The I/O scheduler (106) receives I/O requests from an application to read a logical block of data, which has been stored as a set of physical blocks. These I/O requests are placed on the I/O queue (204). The I/O scheduler (106) may then determine a set of physical blocks to read based on metadata regarding the power state of storage devices (208A-208N) in a storage pool (112) stored in the power state data structure (202), as well as a power-use selection policy (not shown) stored in the policy store (110). The I/O requests on the I/O queue (204) may then be placed on the appropriate power distribution I/O queues (108), which are associated with storage devices upon which the selected physical blocks are stored.

Figure 3:
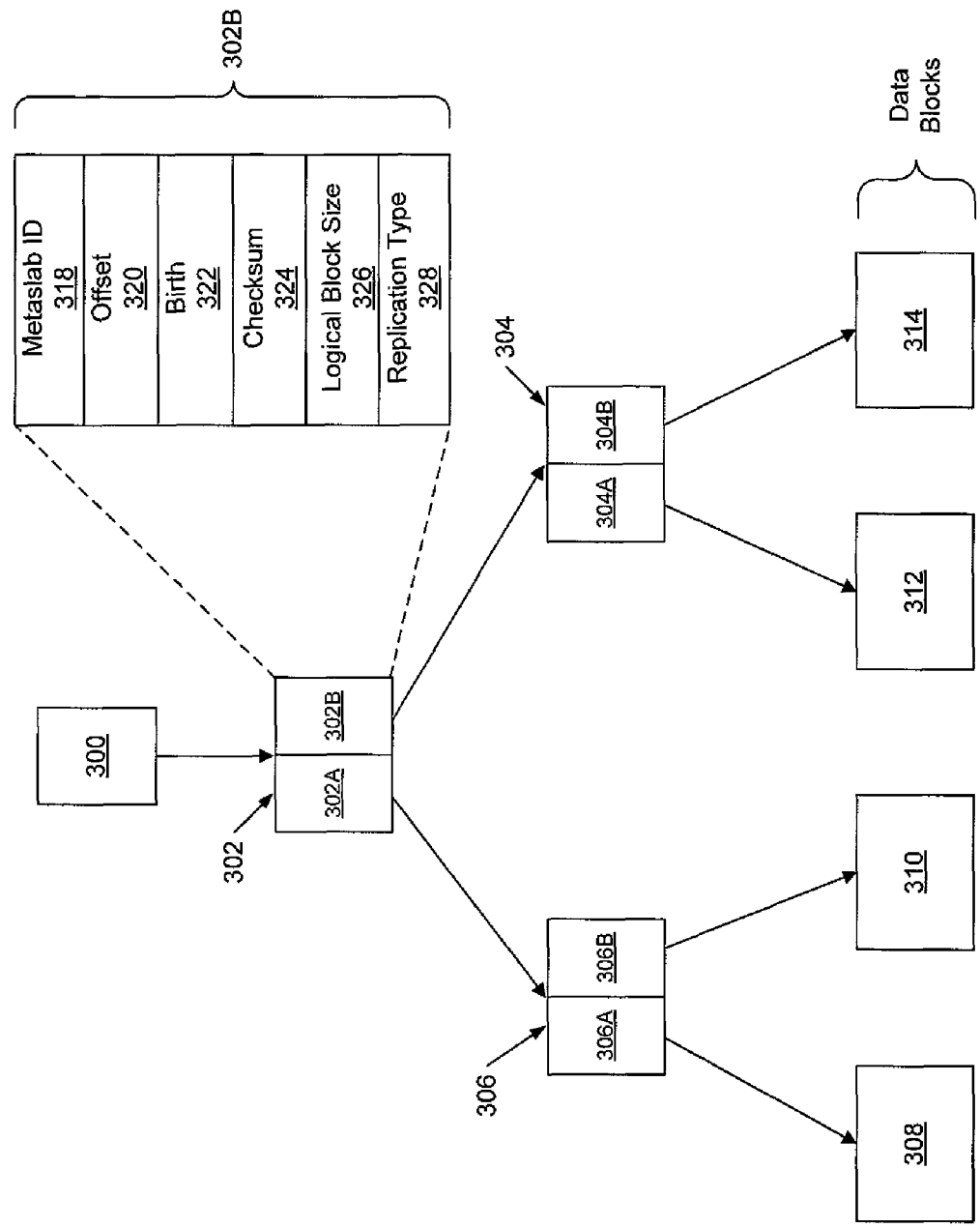
FIG. 3 shows a diagram of a hierarchical data configuration in accordance with one or more embodiments of the invention.

FIG. 3 shows a diagram of a hierarchical data configuration (hereinafter referred to as a "tree") in accordance with one or more embodiments of the invention. As noted above, the storage pool (108) is divided into metaslabs, which are further divided into segments. Each of the segments within the metaslab may then be used to store a data block (i.e., data) or an indirect block (i.e., metadata). In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306).

In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) include actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIGS. 1 and 2). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks include actual data of files within the file system.

In one embodiment of the invention, each block pointer includes a metaslab ID (318), an offset (320) within the metaslab, a birth value (322) of the block referenced by the block pointer, a checksum (324), a logical block size (326), and a replication type (328) of the data stored in the block (data block or indirect block) referenced by the block pointer. In one embodiment of the invention, the metaslab ID (318), offset (320), logical block size (326), and replication type (328) are used to determine the locations of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, a given block (e.g., any of the root, indirect blocks, and/or data blocks shown in FIG. 3) may be stored as a series of smaller blocks. For example, a 2 Kbyte block may be stored as a four 512 byte blocks. In such cases, the 2K block is referred to as a logical block and the four 512 blocks are the physical blocks (i.e., blocks stored in the storage pool). In another example, the 2 Kbyte block may be stored using a replication policy such as RAID-5. In such cases, the logical block is the 2 Kbyte block and the physical blocks include the four 512 byte blocks along with the requisite parity blocks.

Returning to the discussion of FIG. 3, in one or more embodiments of the invention, the logical block may be stored using a replication method (where the replication method may be different for each block). For example, using a mirroring method, there will be several full copies of the logical block located in the file system, stored as several sets of physical blocks. Another example is a RAID-type method, which uses parity blocks along with a set of physical blocks, allowing for the entire logical block to be constructed should one or more of the physical blocks become corrupted. The logical block size and the replication type may be used to determine the location of the corresponding physical blocks in the storage pool. When a replication method is used, there is more than one set of physical blocks that may be used to construct a logical block. In one embodiment of the invention, the I/O scheduler (106 of FIGS. 1 and 2) is configured to select the set of physical blocks to retrieve in order to construct the requested logical block. As discussed above, the manner in which the set of physical blocks is selected is based on the power-use selection policy.

Figure 4:
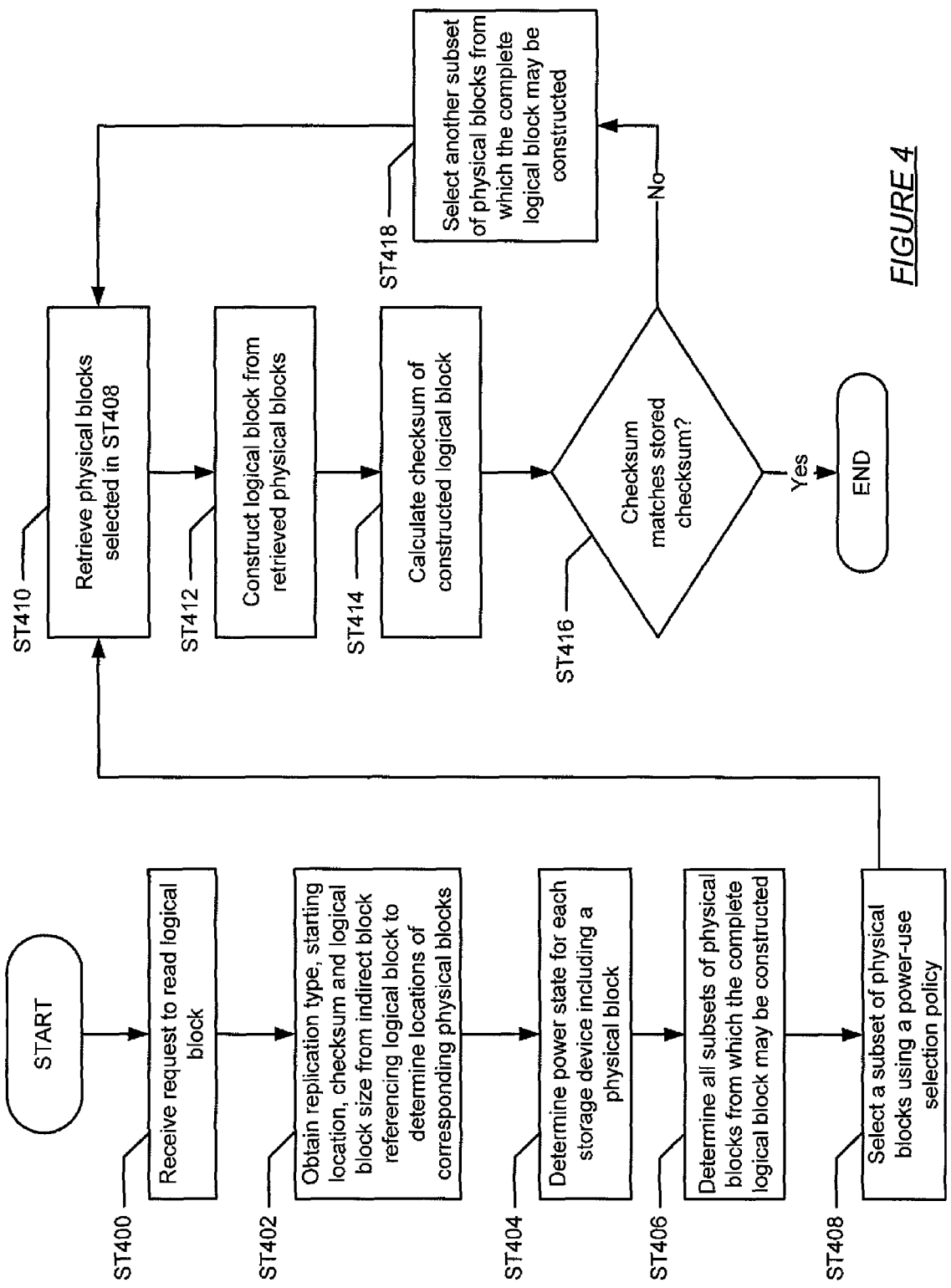
FIGS. 4 shows a flow charts in accordance with one or more embodiments of the invention.

FIGS. 4 shows a flow chart in accordance with one or more embodiments of the invention. More specifically, FIG. 4 details a method for reading a logical block in accordance with one or more embodiments of the invention.

In ST400, the I/O scheduler receives a request to read a logical block. In ST402, the I/O scheduler obtains metadata regarding the requested logical block. This metadata may include the replication method used to store the logical block, the starting location of the stored physical blocks, the size of the logical block, and the checksum of the logical block. This information allows the I/O scheduler to determine the locations of all the physical block stored in the storage pool that are associated with the requested logical block.

In one embodiment of the invention, the information obtained in ST402 may be obtained from the indirect block referencing the logical block (see FIG. 3). The logical block size stored in the indirect block referencing the logical block indicates the actual size of the logical block. In other words, because the logical block size of data may be different than the number of blocks placed on store the data (i.e., due to the use of a replication policy to write the data), the logical block size is required to determine how and where the physical data corresponding to the logical block is stored in the storage pool.

In ST404, the I/O scheduler determines the power states of each storage device on which one or more of the physical blocks identified in ST402 are located. In one embodiment of the invention, power state information for each storage device in the storage pool is stored in a power state data structure. In one embodiment of the invention, the power states may include, but are not limited to, spun-up, spinning-up, spinning-down, spun down, and powered-off.

In ST406, the I/O scheduler determines all subsets of physical blocks from which the complete requested logical block may be constructed. According to one or more embodiments of the invention, there may be several subsets of physical blocks from which the requested logical block may be constructed due to a replication method that was used when the logical block was written to the storage pool.

In ST408, the I/O scheduler selects one of the subsets of physical blocks from which to obtain the data corresponding to the logical block. I/O requests are then placed on the power distribution I/O queues associated with the storage devices on which the selected subset of physical blocks are located.

In ST410, each of the physical blocks in the selected ST408 are retrieved. In ST412, the requested logical block is constructed from the retrieved blocks. In ST414, the checksum of the constructed logical block is calculated. In ST416, a determination is made about whether the checksum calculated in ST414 matches the checksum obtained in ST402. If the checksums match, then the logical block has been read successfully and the process ends.

In ST418, if the checksums do not match, then another subset of physical blocks is selected, which also allow for the construction of the requested logical block. The process then proceeds to ST410.

While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

Figure 5:
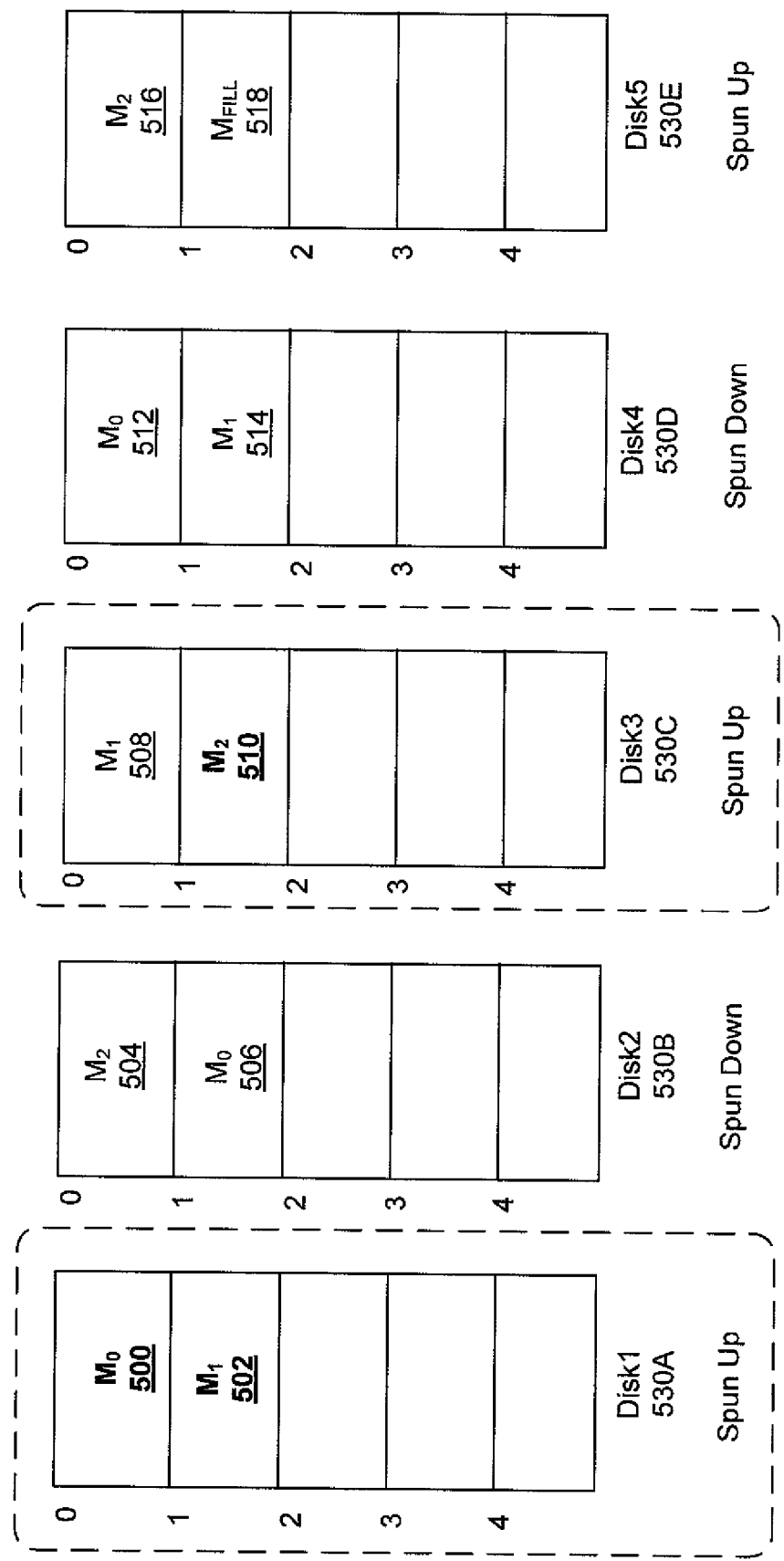
FIGS. 5-7 show diagrams of an example storage pool in accordance with one or more embodiments of the invention.
Figure 6:
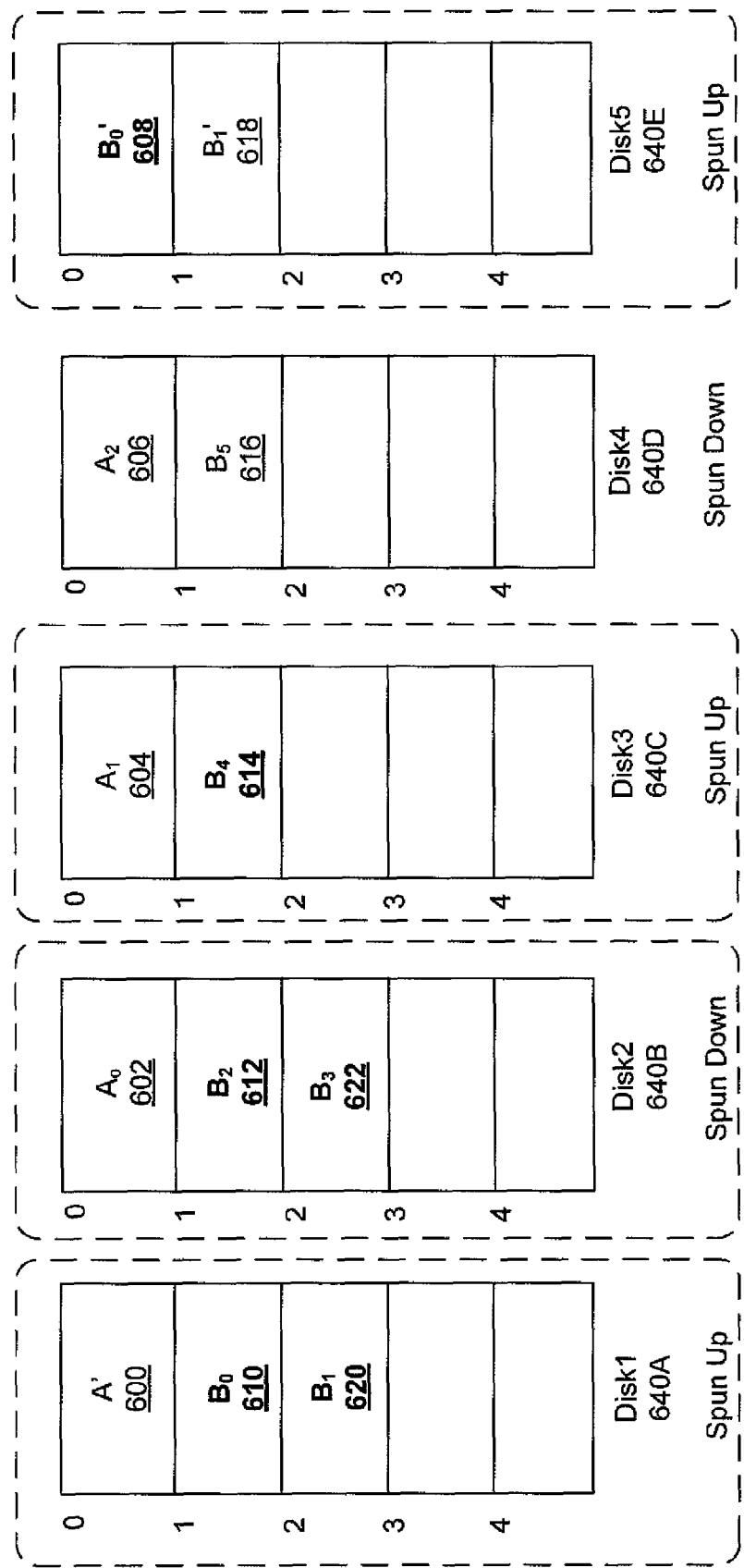
Figure 7:
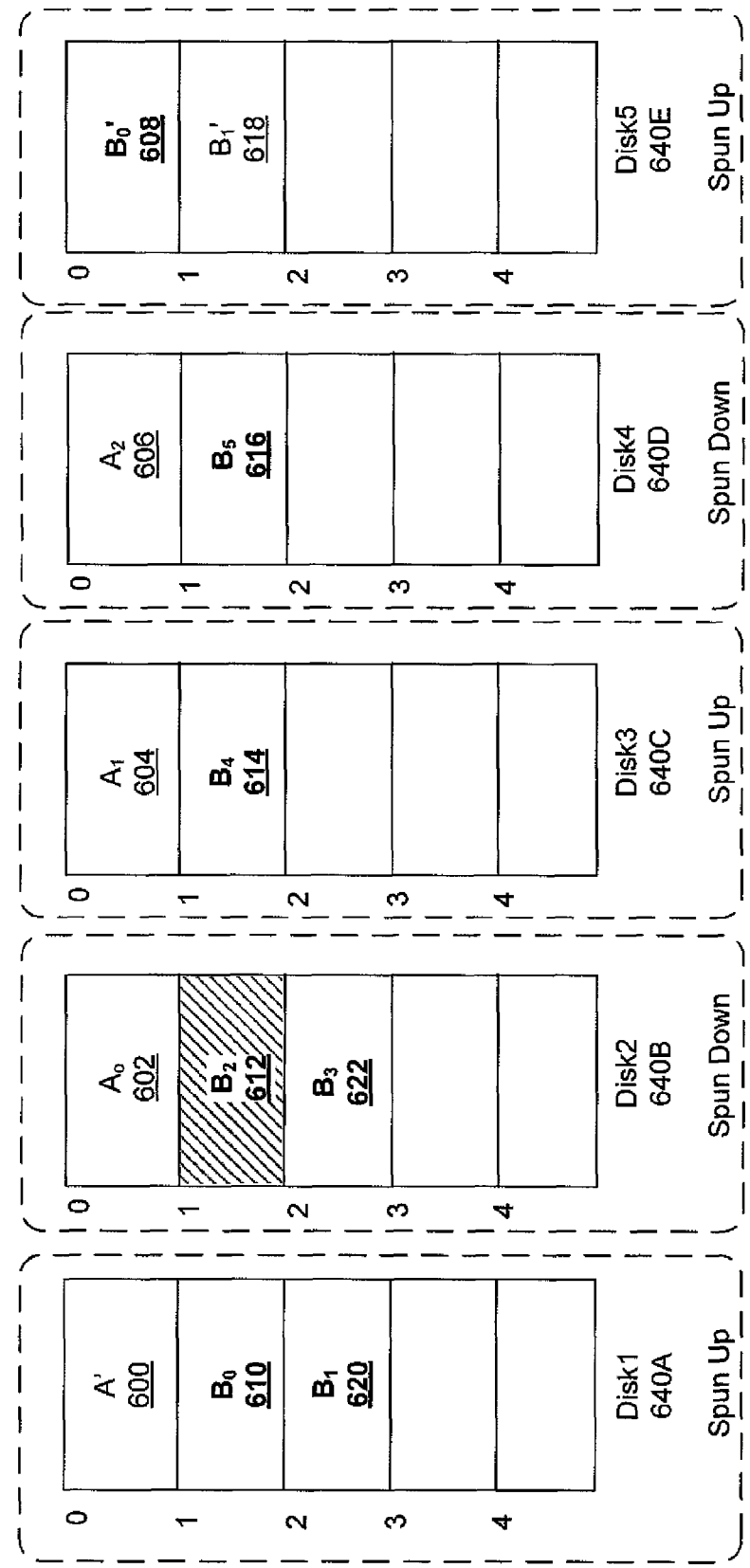

FIGS. 5-7 shows examples in accordance with one or more embodiments of the invention. The examples should not be construed as limiting the scope of the invention.

Turning to FIG. 5, FIG. 5 shows a diagram of a storage pool in which logical block M has been stored using 3-way mirroring. For the purposes of this example assume that the I/O scheduler has received a request to obtain logical block M and that the current state of the disks in the storage pool is as follows: disks 1, 3, and 5 (530A, 530C, and 530E) are spun up, while disk 2 and disk 4 (530B and 530D) are spun down.

Upon receiving the request to retrieve logical block M, the logical block size is obtained. In this example, the logical block size of logical block M is 1.5 Kbytes and each physical block in the storage pool is 512 bytes. Accordingly, each copy of the logical block requires three physical blocks. Thus, the total amount of physical space occupied by logical block M is 4.5 Kbytes (or nine physical blocks) (i.e., $M_0$ (500), $M_1$ (502), $M_2$ (504), $M_0$ (506), $M_1$ (508), $M_2$ (510), $M_0$ (512), $M_1$ (514), $M_2$ (516)). In this example, the file system stores logical blocks (including copies) in even numbers of physical blocks, thus, in order to store 1.5 Kbytes ten physical blocks are allocated—the nine previously cited physical blocks and $M_{FILL}$ (518). Based on the replication scheme, there are a number of subsets of physical blocks which may be retrieved in order to construct the logical block.

More specifically, the logical block M is composed of three physical blocks: $M_0$, $M_1$, and $M_2$. Therefore, in order to be able to construct the full logical block from a set of physical blocks, the I/O scheduler may pull one of several sets of physical blocks. First, the I/O scheduler identifies the physical blocks corresponding to the logical block (i.e., ($M_0$ (500), $M_1$ (502), $M_2$ (504), $M_0$ (506), $M_1$ (508), $M_2$ (510), $M_0$ (512), $M_1$ (514), $M_2$ (516)). The I/O scheduler then determines the power state of each disk that includes at least one of the aforementioned physical blocks.

In this example, Disks 1 through Disk 5 (530A through 530E) hold the physical blocks that correspond to the logical block M. The power states for each of these disks is as follows:

Disk 1 (530A): Spun Up;
Disk 2 (530B): Spun Down;
Disk 3 (530C): Spun Up;
Disk 4 (530D): Spun Down; and
Disk 5 (530E): Spun Up.

Once the I/O scheduler determines these power states, they are stored in the power state data structure. The I/O scheduler may then determine each subset of physical blocks that may be used to construct the logical block, For this example, in order to construct logical block M, one copy of each of: $M_0$, $M_1$, and $M_2$ must be obtained. The following are the potential subsets:

($M_0$ (500), $M_1$ (502), $M_2$ (504))
($M_0$ (500), $M_1$ (502), $M_2$ (510))
($M_0$ (500), $M_1$ (502), $M_2$ (516))
($M_0$ (500), $M_1$ (508), $M_2$ (504))
($M_0$ (500), $M_1$ (508), $M_2$ (510))
($M_0$ (500), $M_1$ (508), $M_2$ (516))
($M_0$ (500), $M_1$ (514), $M_2$ (504))
($M_0$ (500), $M_1$ (514), $M_2$ (510))
($M_0$ (500), $M_1$ (514), $M_2$ (516))
($M_0$ (506), $M_1$ (502), $M_2$ (504))
($M_0$ (506), $M_1$ (502), $M_2$ (510))
($M_0$ (506), $M_1$ (502), $M_2$ (516))
($M_0$ (506), $M_1$ (508), $M_2$ (504))
($M_0$ (506), $M_1$ (508), $M_2$ (510))
($M_0$ (506), $M_1$ (508), $M_2$ (516))
($M_0$ (506), $M_1$ (514), $M_2$ (504))
($M_0$ (506), $M_1$ (514), $M_2$ (510))
($M_0$ (506), $M_1$ (514), $M_2$ (516))
($M_0$ (512), $M_1$ (502), $M_2$ (504))

($M_0$ (512), $M_1$ (502), $M_2$ (510))
($M_0$ (512), $M_1$ (502), $M_2$ (516))
($M_0$ (512), $M_1$ (508), $M_2$ (504))
($M_0$ (512), $M_1$ (508), $M_2$ (510))
($M_0$ (512), $M_1$ (508), $M_2$ (516))
($M_0$ (512), $M_1$ (514), $M_2$ (504))
($M_0$ (512), $M_1$ (514), $M_2$ (510))
($M_0$ (512), $M_1$ (514), $M_2$ (516))

Using the power-use selection policy, the aforementioned subsets, and the power states in the power state data structure, the I/O scheduler determines the aggregate power cost for reading logical block M using each of the subsets. According to one or more embodiment of the invention, the power-use selection policy considers reading from disks that are currently spun up as a low power cost, because much less power is needed to read from a disk that is already spun up as compared with spinning up a disk that is currently not spun up. In this example, because Disk 1 (530A), Disk 2 (530C), and Disk 3 (530E) are already spun up, it would require less power to try to read from these disks. In this example, to avoid unnecessarily spinning up any more disks, the following physical blocks could be read to construct logical block M:

($M_0$ (500), $M_1$ (502), $M_2$ (510))
($M_0$ (500), $M_1$ (502), $M_2$ (516))
($M_0$ (500), $M_1$ (508), $M_2$ (510))
($M_0$ (500), $M_1$ (508), $M_2$ (516))

In the example shown, the I/O scheduler has chosen to read from Disk 1 (530A) and Disk 3 (530C), which hold the physical block combination: ($M_0$ (500), $M_1$ (502), $M_2$ (510)). A person skilled in the art will appreciate that this is a simplified version of how the I/O scheduler would select the subset of physical blocks and disks to read from using the power states. There may be other differences in the characteristics of each disk and how it is running that affect the power cost required to read data located on the disk. The I/O scheduler may have chosen other combinations of physical blocks from the same storage devices. For example, reading from physical blocks ($M_0$ (500), $M_1$ (508), and $M_2$ (510)) would again only require reading from Disk 1 (530A) and Disk 3 (530C).

Further, because the logical block was written using a mirrored replication method in the storage pool, finding a number of subsets of physical blocks from which combine to form the logical block allows for the I/O scheduler to make use of advantages provided by a mirrored replication system. For example, if the I/O scheduler sends requests to the power distribution I/O queues corresponding to Disk 1 (530A) and Disk 3 (530C), but found that Disk 3 (530C) was corrupt, there are alternative subsets of physical blocks located on disks that already spun up. For example, the I/O scheduler may send I/O requests to the power distribution I/O queues corresponding to Disk 1 (530A) and Disk 5 (530E). In doing so, the file system may read the subset of physical blocks ($M_0$ (500), $M_1$ (502), and $M_2$ (516)).

FIG. 6 shows a diagram of an example storage pool in accordance with one embodiment of the invention. More specifically, FIG. 6 shows a storage pool in which logical blocks are written using a RAID-type replication method. As shown in FIG. 6, the storage pool includes five disks (i.e., Disk 1 (640A), Disk 2 (640B), Disk 3 (640C), Disk 4 (640D), Disk 5 (640E)). Further, two logical blocks, A and B, are stored in the storage pool.

Logical block A is 1.5 Kbytes and is stored across three physical blocks (i.e., $A_0$ (602), $A_1$ (604), and $A_2$ (606)). Further, a single parity block (A' (600)) is generated for logical block A using $A_0$ (602), $A_1$ (604), and $A_2$ (606). As shown in FIG. 6, the parity block (A' (600)) is written to the storage pool first followed by the physical blocks that make up logical block A (ie., $A_0$ (602), $A_1$ (604), and $A_2$ (606)).

Logical block B is 3 Kbytes and is stored across six physical blocks (i.e., $B_0$ (610), $B_1$ (620), $B_2$ (612), $B_3$ (622), $B_4$ (614), $B_5$ (616)). Further, two parity blocks ($B'_0$ (608) and $B'_1$ (618)) are generated for the aforementioned physical blocks. Specifically, $B'_0$ (608) is generated using $B_0$ (610), $B_2$ (612), $B_4$ (614), $B_5$ (616), while $B'_1$ (618) is generated using $B_1$ (620) and $B_3$ (622).

For the purposes of this example, consider the scenario in which a request for logical block B is received. As discussed above, logical block B is stored in the storage pool using eight physical blocks $B_0$ (610), $B_1$ (620), $B_2$ (612), $B_3$ (622), $B_4$ (614), $B_5$ (616), $B_0'$ (608), and $B_1'$ (618). In the example given, one or more of the aforementioned blocks is present on each of the disks in the storage pool.

The I/O scheduler (or a related process) determines the location for each of the aforementioned physical blocks. Using this information, the power state of each of the disks upon which one or more of the physical blocks is located is obtained. In this example, Disk1 (640A), Disk3 (640C), and Disk 5 (640E) are spun up, while Disk2 (640B) and Disk 4 (640D) are spun down.

The I/O scheduler then determines the possible subsets of the physical blocks that may be used to construct the logical block. Because the logical block has been stored using a RAID-type replication method, there are multiple subsets of physical blocks that allow for the construction of the logical block. These include:

($B_0$ (610), $B_1$ (620), $B_2$ (612), $B_3$ (622), $B_4$ (614), $B_5$ (616))
($B_1$ (620), $B_2$ (612), $B_3$ (622), $B_4$ (614), $B_5$ (616), $B_0'$ (608))
($B_0$ (610), $B_1$ (620), $B_3$ (622), $B_4$ (614), $B_5$ (616), $B_0'$ (608))
($B_0$ (610), $B_1$ (620), $B_2$ (620), $B_3$ (622), $B_5$ (616), $B_0'$ (608))
($B_0$ (610), $B_1$ (620), $B_2$ (612), $B_3$ (622), $B_4$ (614), $B_0'$ (608))
($B_2$ (612), $B_3$ (622), $B_4$ (614), $B_5$ (616), $B_0'$ (608), $B_1'$ (618))
($B_0$ (610), $B_3$ (622), $B_4$ (614), $B_5$ (616), $B_0'$ (608), $B_1'$ (618))
($B_0$ (610), $B_2$ (620), $B_3$ (622), $B_5$ (616), $B_0'$ (608), $B_1'$ (618))
($B_0$ (610), $B_2$ (612), $B_3$ (622), $B_4$ (614), $B_0'$ (608), $B_1'$ (618))
($B_1$ (620), $B_2$ (612), $B_4$ (614), $B_5$ (616), $B_0'$ (608), $B_1'$ (618))
($B_0$ (610), $B_1$ (620), $B_4$ (614), $B_5$ (616), $B_0'$ (608), $B_1'$ (618))
($B_0$ (610), $B_1$ (620), $B_2$ (620), $B_5$ (616), $B_0'$ (608), $B_1'$ (618))
($B_0$ (610), $B_1$ (620), $B_2$ (612), $B_4$ (614), $B_0'$ (608), $B_1'$ (618))
($B_0$ (610), $B_2$ (612), $B_3$ (622), $B_4$ (614), $B_5$ (616), $B_1'$ (618))
($B_0$ (610), $B_1$ (620), $B_2$ (612), $B_4$ (614), $B_5$ (616), $B_1'$ (618))

Those skilled in the art will appreciate that one or more of the aforementioned subsets includes one or more parity blocks, which may be used to reconstruct one or more of the other physical blocks necessary to obtain logical block B.

The I/O scheduler may then use a power-use selection policy to determine which subset of physical blocks should be used based on the power cost required to obtain the physical blocks in the subset. For purposes of this example assume that reading from disks that are already spun up requires less power as compared with reading from disks are spun down. Returning to the example, as shown in FIG. 6, only Disk1 (640A), Disk3 (640C), and Disk5 (640E) are already spun up. Accordingly, it is not possible to read any of the subsets of physical blocks using only the three spun up storage devices. Accordingly, it is necessary to spin up an additional disk in order to read any of the subsets of physical blocks. A person skilled in the art would appreciate that spinning up either Disk2 (640B) or Disk4 (640D) would be sufficient to read one of the subsets of physical blocks necessary to reconstruct logical block B. For the purposes of this example, the power-use selection policy selects Disk1 (640A), Disk2 (640B), Disk3 (640C), and Disk5 (640E). As such, it is necessary to spin up Disk2 in order to read enough physical blocks to construct logical block B. For purposes of the example, the subset of physical blocks that are used to construct the logical block include: ($B_0$ (610), $B_1$ (620), $B_2$ (612), $B_3$ (622), $B_4$ (614), $B_0'$ (608)). Retrieved physical blocks $B_0'$ (608), $B_0$ (610), $B_2$ (612), and $B_4$ (614) may be used to reconstruct block $B_5$. Subsequently, physical blocks $B_0$ (610), $B_1$ (620), $B_2$ (612), $B_3$ (622), $B_4$ (614), and constructed physical block $B_5$ may be combined to form logical block B.

FIG. 7 illustrates this example by showing the same data pool configuration as the one shown in FIG. 6 and described above. However, in this example, physical block $B_2$ (612) is corrupt. Accordingly, when the checksum of constructed logical block B is compared with a stored checksum, the checksums will not match. In such cases, a different subset of physical blocks is selected to construct logical block B.

As shown above, there are several subsets of physical blocks that may be use to construct logical block B. In this example, because $B_2$ (612) is corrupt, there are no subsets of data that may be read using only the original four selected disks discussed above with respect to FIG. 6. Those skilled in the art will appreciate that because there are four physical blocks associated with each parity block, at least three of the physical blocks are required to reconstruct the remaining physical block. In view of this, the I/O scheduler sends an I/O request to the 110 power distribution 110 queue corresponding to Disk 4 (640D) to read physical block $B_5$ (616). As shown in the example, the following physical blocks are read to reconstruct the logical block: ($B_0$ (610), $B_1$ (620), $B_3$ (622), $B_4$ (614), $B_5$ (616), $B_0'$ (608)). Those skilled in the art will appreciate that this is just one of several subsets of physical blocks that may be read to reconstruct the original logical block. For example, parity block $B_1'$ could be used to reconstruct either $B_1$ (620) or $B_3$ (622) and thus form a different subset of physical blocks that would still work to combine to form logical block B.

Figure 8:
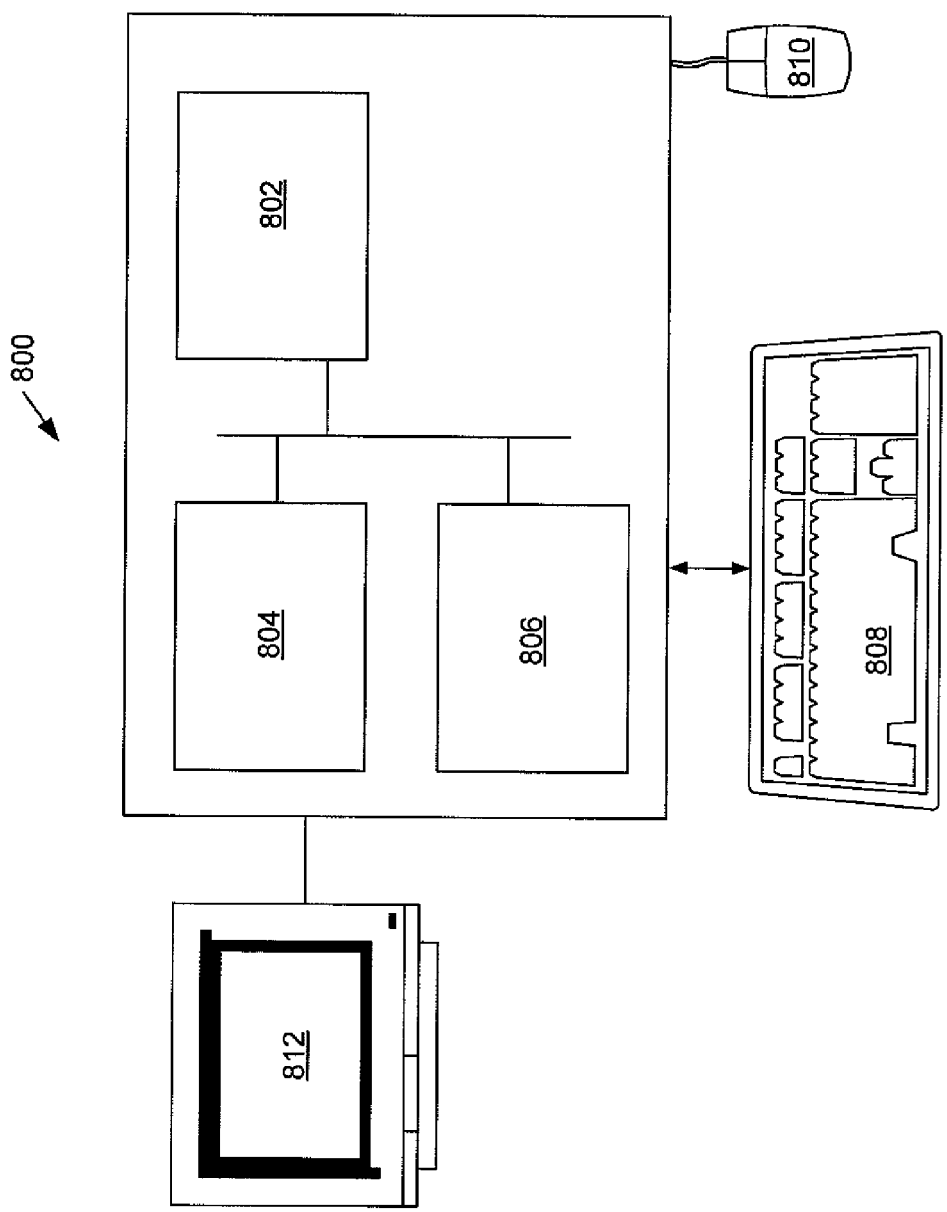
FIG. 8 shows a diagram of a computer system in accordance with one or more embodiments of the invention.

Embodiments of the invention may be implemented on virtually any type of computer regardless of the platform being used. For example, as shown in FIG. 8, a computer system (800) includes one or more processor(s) (802), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (808), a mouse (810), or a microphone (not shown). Further, the computer (800) may include output means, such as a monitor (812) (e.g., a liquid crystal display (LCD), a plasma display, or cathode ray tube (CRT) monitor). The computer system (800) may be connected to a network (814) (eg., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., operating system, file system, storage pool, disk, I/O scheduler, compression module, encryption module, checksum module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for retrieving a logical block, comprising:
receiving a request to read the logical block;
obtaining metadata associated with the logical block, wherein the metadata comprises:
a replication type used to store the logical block, and
physical block locations in a storage pool for each physical block associated with the logical block, wherein each physical block location specifies one of a plurality storage devices in the storage pool;
obtaining power state information comprising a power state for each of the plurality of storage devices specified in the physical block locations;
selecting a first set of physical block locations using the metadata, the power state information, and a power-usage selection policy;
generating a first set of I/O requests, wherein each I/O request of the set of I/O requests specifies one of the issuing the first set of I/O requests;
issuing the first set of I/O requests;
receiving a first set of physical blocks in response to the first set of I/O requests; and
constructing the logical block using the first set of physical blocks.

2. The method of claim 1, further comprising:
after constructing the logical block, calculating a checksum of the logical block;
comparing the checksum to a stored checksum of the logical block, wherein the checksum and stored checksum do not match;
selecting a second set of physical block locations using the metadata, the power state information, and the power-usage selection policy;
generating a second set of I/O requests, wherein each I/O request of the second set of I/O requests specifies one of the second set of physical block locations;
issuing the second set of I/O requests;
receiving a second set of physical blocks in response to the second set of I/O requests; and
constructing the logical block using the second set of physical blocks.

3. The method of claim 1, wherein the replication type defines a level of replication of the logical block in the storage pool.

4. The method of claim 3, wherein the replication type is one selected from a group consisting of 2-way mirroring, n-way mirroring, and RAID-type replication.

5. The method of claim 1, wherein the power state is one selected from a group consisting of spun-up, spinning-up, spinning-down, and spun down.

6. The method of claim 1, wherein selecting the first set of physical block locations comprises:
selecting the first set of physical block locations, wherein the first set of physical blocks at the first set of physical block locations combine to form the logical block;
determining a first power cost to obtain the first set of physical blocks located at the first set of physical block locations using the power state information;
selecting a second set of physical block locations, wherein a second set of physical blocks at the second set of physical block locations combine to form the logical block;
determining a second power cost to obtain the second set of physical blocks located at the second set of physical block locations using the power state information;
selecting the first set of physical block locations using the first power cost, the second power cost and the power-usage selection policy; and
determining a first set of power distribution Input/Output (I/O) queues using the first set of physical block locations.

7. The method of claim 6, wherein each of the power distribution I/O queues is associated with one of the plurality of storage devices.

8. The method of claim 1, wherein the first set of I/O requests comprises a plurality of I/O requests.

9. A system, comprising:
a storage pool comprising a plurality of storage devices; and
a file system comprising:
an I/O scheduler configured to:
receive a request to read a logical block;
obtain metadata associated with the logical block, wherein the metadata comprises: a replication type used to store the logical block, and physical block locations in the storage pool for each physical block associated with the logical block, wherein each physical block location specifies one of the plurality of storage devices in the storage pool;
obtain power state information comprising a power state for each of the plurality of storage devices specified in the physical block locations;
select a first set of physical block locations using the metadata, the power state information, and a power-usage selection policy;
generate a first set of I/O requests, wherein each I/O request of the first set of I/O requests specifies one of the first set of physical block locations; and
issue the first set of I/O requests,
wherein the file system is configured to:
receive a first set of physical blocks in response to the first set of I/O requests, and
constructing the logical block using the first set of physical blocks.

10. The system of claim 9,
wherein the file system configured to:
after constructing the logical block, calculate a checksum of the logical block;
compare the checksum to a stored checksum of the logical block, wherein the checksum and stored checksum do not match;
select a second set of physical block locations using the metadata, the power state information, and the power-usage selection policy;
generate a second set of I/O requests, wherein each I/O request of the second set of I/O requests specifies one of the second set of physical block locations; and
issue the second set of I/O requests, and
wherein the file system is further configured to:
receive a second set of physical blocks in response to the second set of 1/O requests; and
construct the logical block using the second set of physical blocks.

11. The system of claim 9, wherein the replication type defines a level of replication of the logical block in the storage pool.

12. The system of claim 11, wherein the replication type is one selected from a group consisting of 2-way mirroring, n-way mirroring, and RAID-type replication.

13. The system of claim 9, wherein the power state is one selected from a group consisting of spun-up, spinning-up, spinning-down, and spun down.

14. The system of claim 9, wherein selecting the first set of physical block locations comprises:
selecting the first set of physical block locations, wherein the first set of physical blocks at the first set of physical block locations combine to form the logical block;
determining a first power cost to obtain the first set of physical blocks located at the first set of physical block locations using the power state information;
selecting a second set of physical block locations, wherein a second set of physical blocks at the second set of physical block locations combine to form the logical block;
determining a second power cost to obtain the second set of physical blocks located at the second set of physical block locations using the power state information;
selecting the first set of physical block locations using the first power cost, the second power cost and the power-usage selection policy; and
determining a first set of power distribution Input/Output (I/O) queues using the first set of physical block locations.

15. The system of claim 14, wherein each of the power distribution I/O queues is associated with one of the plurality of storage devices.

16. The system of claim 9, wherein the first set of I/O requests comprises a plurality of I/O requests.

17. A computer readable medium comprising computer readable program code embodied therein for causing a computer system to:
receive a request to read a logical block;
obtain metadata associated with the logical block, wherein the metadata comprises:
a replication type used to store the logical block, and
physical block locations in a storage pool for each physical block associated with the logical block, wherein each physical block location specifies one of a plurality of storage devices in the storage pool;
obtain power state information comprising a power state for each of the plurality of storage devices specified in the physical block locations;
select a first set of physical block locations using the metadata, the power state information, and a power-usage selection policy; and generate a first set of I/O requests, wherein each I/O request of the first set of I/O requests specifies one of the first set of physical block locations;

issue the first set of I/O requests;

receive a first set of physical blocks in response to the first set of I/O requests; and construct the logical block using the first set of physical blocks.

18. The computer readable medium of claim 17, further comprising computer readable program code embodied therein for causing the computer system to:

after constructing the logical block, calculate a checksum of the logical block;

compare the checksum to a stored checksum of the logical block, wherein the checksum and stored checksum do not match;

select a second set of physical block locations using the metadata, the power state information, and the power-usage selection policy;

generate a second set of I/O requests, wherein each I/O request of the second set of I/O requests specifies one of the second set of physical block locations;

issue the second set of I/O requests;

receive a second set of physical blocks in response to the second set of I/O requests; and construct the logical block using the second set of physical blocks.

19. The computer readable medium of claim 18, wherein the first set of I/O requests comprises a plurality of I/O requests.

20. The computer readable medium of claim 18, further comprising computer readable program code embodied therein for causing the computer system to:

determine a first set of power distribution Input/Output (I/O) queues using the first set of physical block locations, wherein each power distribution I/O queue of the first set of power distribution I/O queues is associated with one of the plurality of storage devices.

* * * * *